W. J. COLEBURN.
VALVE FOR IRRIGATION PROJECTS.
APPLICATION FILED MAR. 31, 1919.
1,374,358.
Patented Apr. 12, 1921.
2 SHEETS—SHEET 1.
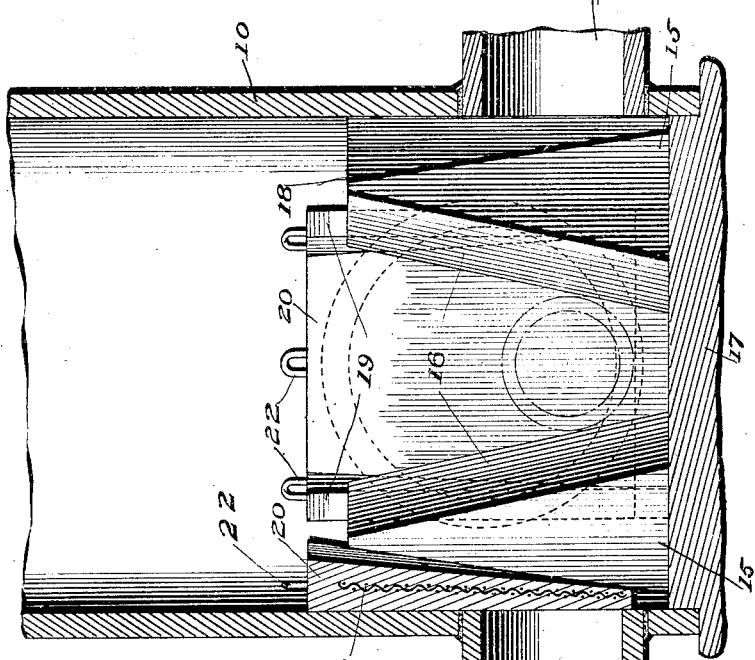
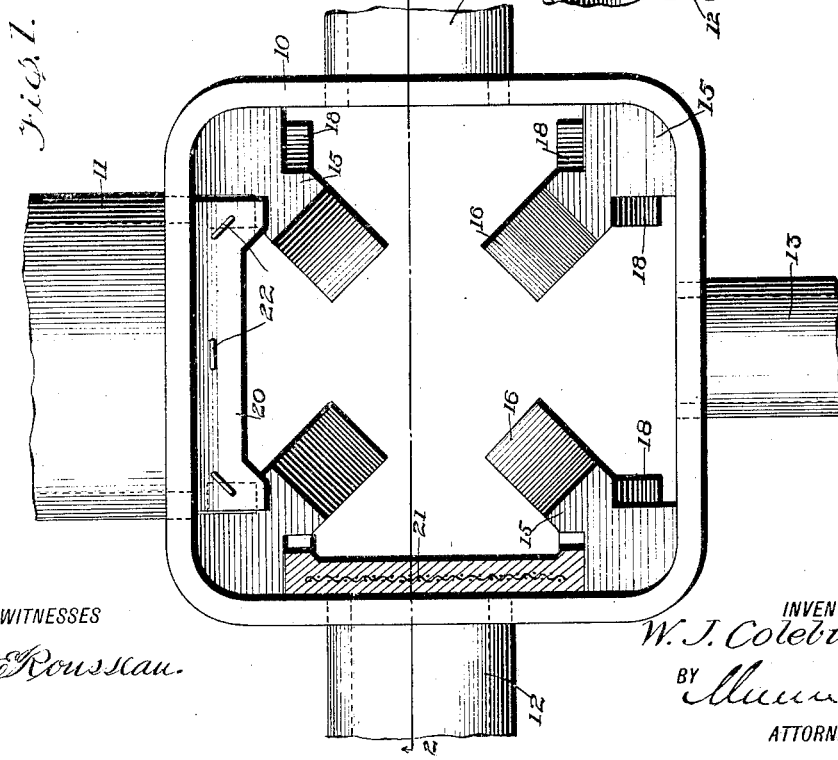
WITNESSES
INVENTOR
W. J. Coleburn,
BY
ATTORNEYS

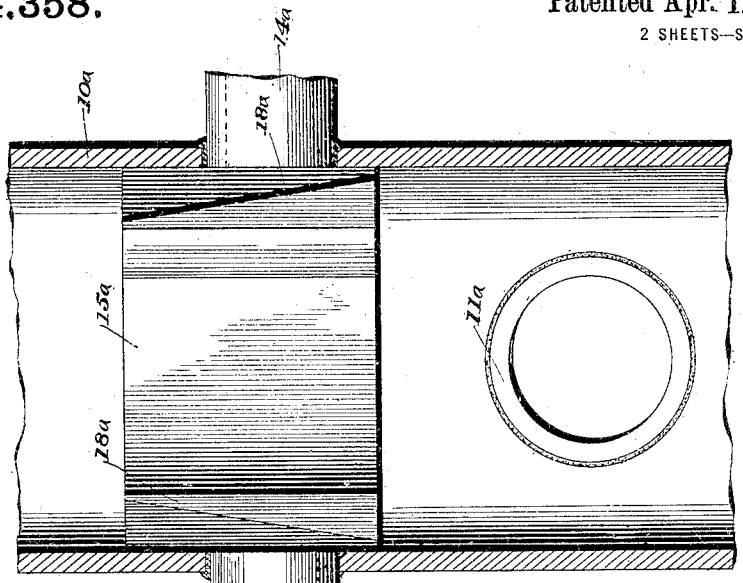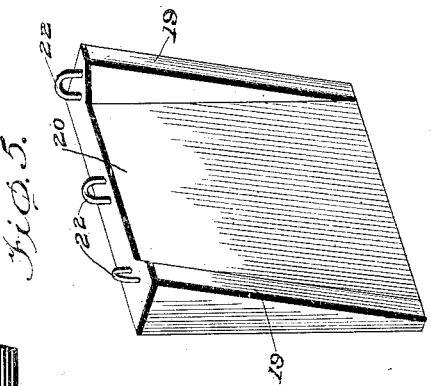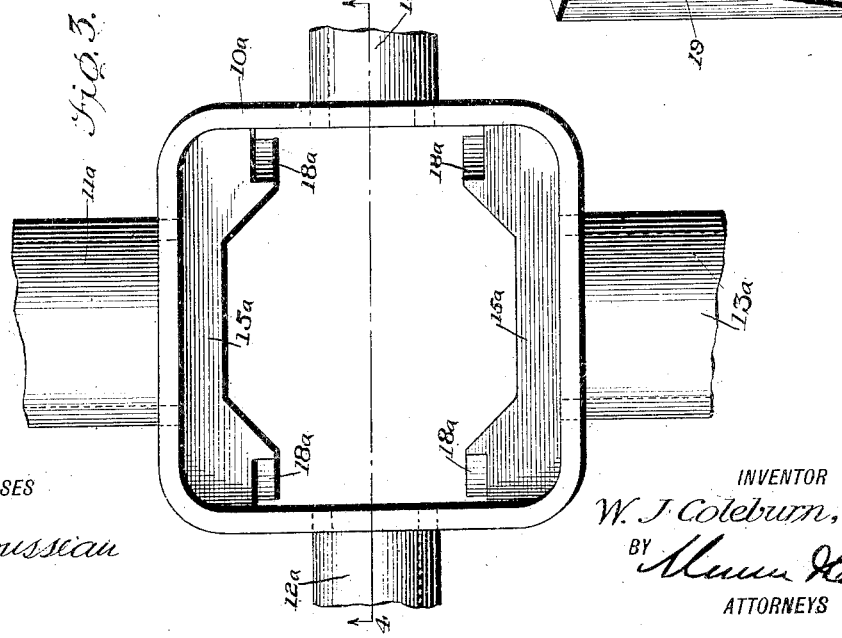

UNITED STATES PATENT OFFICE.

WILLIAM JOHN COLEBURN, OF BEAUFORT, NORTH CAROLINA.

VALVE FOR IRRIGATION PROJECTS.

1,374,358. Specification of Letters Patent. Patented Apr. 12, 1921.

Application filed March 31, 1919. Serial No. 286,614.

*To all whom it may concern:*

Be it known that I, WILLIAM J. COLEBURN, a citizen of the United States, and a resident of Beaufort, in the county of Carteret and State of North Carolina, have invented certain new and useful Improvements in Valves for Irrigation Projects, of which the following is a specification.

My present invention relates generally to irrigation devices, and more particularly to a simple, effective valve structure for use in connection with tiles for transporting water in irrigation projects, my object being the provision of a simple, inexpensive arrangement which may be readily associated, in fact molded in connection with irrigation tiles at whatever points may be desirable for the location of the valve boxes.

Another object is the provision of a simple, inexpensive construction, as well as one which will be effective in use as a valve, both for the purpose of controlling the flow where the tiles are in the same horizontal plane and in vertically spaced planes.

With these objects, my invention will be better understood by reference to the following description, in connection with the showing contained in the accompanying drawings, forming a part of this specification, and wherein:—

Figure 1 is a top plan view, partly in horizontal section, illustrating a four-way valve box constructed in accordance with my invention, Fig. 2 is a vertical section taken substantially on line 2—2 of Fig. 1, Fig. 3 is a top plan view of a slightly different form wherein provision is made for the use of but two valves, Fig. 4 is a vertical section taken on line 4—4 of Fig. 3, and Fig. 5 is a detail perspective view of one of the valve pieces.

Referring now to these figures, and particularly to Figs. 1 and 2, my invention proposes the molding or otherwise accomplished erection of a vertically extending valve box which is generally seen at 10, and which as best seen in Fig. 1 is generally of rectangular shape, providing for reception in openings formed in its several sides, of the several irrigation tiles indicated at 11, 12, 13 and 14.

Within the valve box 10, and located in the corners thereof between the openings receiving the several irrigation tiles, are formed the seat blocks 15, the tapering inner portions 16 of which are built up as seen in Fig. 2 from the base 17 of the valve box 10, for maximum strength, inasmuch as these several seat blocks 15 as shown, are entirely separate and distinct from one another, where it is necessary to provide for the reception of four valve gates, one opposite the communicating end of each of the irrigation tiles.

For this purpose, each of the seat blocks 15 has inclined valve seats 18 at its opposite sides, facing the inner adjacent flat surfaces of the valve box 10, each of which seats is located at one side of one of the irrigation tiles and is inclined downwardly toward the inner surface of the valve box in order to coöperate with the tapering side flanges or runners 19 formed vertically along the sides of each of the valve gates 20 at the rear surface thereof, as will be seen by an inspection of Fig. 5.

The outer or forward face of the valve gate 20 is flat to coöperate with the inner surface of the valve box 10 around the respective tile end, so as to pull the communicating opening by virtue of the weight of the valve gate and the coöperation of its tapering flanges or runners 19 and the inclined valve seat 18 of the blocks 15.

Further referring to the form of construction of Figs. 1 and 2, it will be noted particularly from the latter figure that all of the irrigation tiles lead into the valve box 10 upon the same horizontal level, and the seat blocks 15 within the corners of the valve box may thus be conveniently supported in part by the base 17 of the box.

By reference to Figs. 3 and 4, however, it will be noted that at least in some instances it becomes necessary to form a valve box 10$^a$ which is elongated vertically for communication with tiles 11$^a$, 12$^a$, 13$^a$ and 14$^a$ of which the tiles 11$^a$ and 13$^a$ lead into the valve box 10$^a$ upon a plane substantially below that of the plane of the tiles 12$^a$ and 14$^a$, as will be seen particularly in Fig. 4. In this connection it is obviously not possible to support corner seat blocks partially upon the base of the valve box and it is preferable in such instances to provide for the reception of but a pair of valves adjacent one or the other of the pairs of irrigation tiles. In the present instance I have shown the seats for the valve gate 20 arranged opposite the tiles 12$^a$ and 14$^a$, the valve seats 18ᵃ being formed similarly to the seats 18 before described, although in this instance at the opposite ends of seat blocks 15ᵃ which are formed in connection with opposite side walls of the valve box 10ᵃ and extend entirely across such sides. In this way the necessary support for the valve seats may be had without resorting to partial support of the seat blocks upon the base of the valve box.

Referring again to Figs. 1 and 5, it is preferable that the several valve gates, which are formed of plastic material, be reinforced by an embedded open mesh reinforcing wire or fabric 21, and that the larger ends of said valve gates be provided with projecting handles 22, for instance in the form of staples as shown in Figs. 2 and 5, which are partially embedded in the material of the valve gate, and which may be either independent features, or simply continuations of the reinforcement of the gate, as desired.

In either instance it is obvious that my invention provides for the simple, ready and effective formation of valve boxes and valves in connection with irrigation tiles of various irrigation projects, and it is further obvious that my invention provides for valves of such a construction that the valve gates or valve members may be readily manipulated and placed in and removed from operative position, as well as valve members or valve gates which are readily susceptible to interchangeable use among a number of valve boxes.

It will also be obvious that by the use of valves of the character provided by my invention, the system in which they are used may be operated either as an irrigation system or a drainage system. For instance, with the valves in place, the water will be held in the pipes, and thus in the ground, while by removing the valves connections thus provided for between the pipes and the water are carried away.

I claim:

1. In an arrangement of the character described, a valve box having openings in its walls, for the connection of irrigation tiles, and having internal seat blocks provided with valve seats inclined downwardly and toward the inner surface of the valve box, said seats being arranged at opposite sides of the valve box openings and out of a line connecting the said openings, and valve gates having flat outer faces for movement against the inner surfaces of the valve box around its opening and provided with inclined rear faces for coöperation with the inclined valve seats, for the purpose described.

2. A valve box for the purpose described, having an opening and internal seat blocks provided with inclined valve seats opposing the inner surfaces of the box at opposite sides of the opening and inclined downwardly and toward said inner surfaces, and a valve gate having rear inclined faces for coöperation with the said seats, the opposite face of the valve gate coöperating with the inner surface of the valve box around its opening.

3. A valve box for the purpose described, having internal seat blocks provided with inclined valve seats opposing the inner surfaces of the box and inclined downwardly and toward said inner surfaces, and valve gates having rear inclined faces for coöperation with the said seats, the opposite faces of the valve gates coöperating with the inner surfaces of the valve box, and said valve gates having internally reinforced bodies and provided with upstanding handles at their upper ends, for the purpose described.

4. A valve box for the purpose described, having flat openings in its walls and having inner flat surfaces adjacent to and around the said openings, seat blocks formed within the valve box and provided with vertically inclined valve seats opposing the said flat inner surfaces of the valve box at opposite sides of its said openings, and valve gates having outer flat surfaces for coöperation with the inner surfaces of the valve box and provided with inclined opposite surfaces for coöperation with the inclined valve seats, as described.

5. A generally rectangular vertically disposed valve box formed of plastic material, for the purpose described, having openings in its side walls and provided with internal seat blocks formed in the corners thereof, each of which is provided at its opposite sides with vertically inclined valve seats opposing certain of the side walls of the valve box, and valve gates having outer faces for coöperation with the inner surfaces of the valve box around its openings, and having inner inclined faces adjacent its opposite sides for coöperation with the inclined valve seats, as described.

6. The combination with a valve box having an opening and seat blocks formed therein at opposite sides of the opening and provided with inclined valve seats, of a valve member formed of reinforced concrete, having flanges along one side provided with inclined edges for coöperation with the said seats, and members embedded in the upper edge of the valve and forming handles as and for the purpose described.

WILLIAM JOHN COLEBURN.

Witnesses:
J. B. THOMAS,
M. D. BATCHELDER.